United States Patent
Anderson et al.

(10) Patent No.: US 11,235,920 B2
(45) Date of Patent: Feb. 1, 2022

(54) BEVERAGE INGREDIENT POD

(71) Applicant: PepsiCo, Inc., Purchase, NY (US)

(72) Inventors: Keyonna Anderson, Chicago, IL (US); Girish Nilkanth Deshpande, Carmel, NY (US); Bruno Telesca, Sandy Hook, CT (US); Michael I. Custer, Batavia, IL (US); Thierry Jean Robert Fabozzi, Geneva (CH); Jae Young Jeon, Des Plaines, IL (US); Brent Lindberg, St. Charles, IL (US); Jenna Walsh, Batavia, IL (US)

(73) Assignee: PepsiCo, Inc., Purchase, NY (US)

( * ) Notice: Subject to any disclaimer, the term of this patent is extended or adjusted under 35 U.S.C. 154(b) by 62 days.

(21) Appl. No.: 16/003,686

(22) Filed: Jun. 8, 2018

(65) Prior Publication Data
US 2019/0375574 A1 Dec. 12, 2019

(51) Int. Cl.
| B65D 81/32 | (2006.01) |
| B67D 3/00 | (2006.01) |
| B65D 85/804 | (2006.01) |
| A47J 31/40 | (2006.01) |

(52) U.S. Cl.
CPC ......... *B65D 81/3211* (2013.01); *A47J 31/407* (2013.01); *B65D 85/804* (2013.01); *B67D 3/0019* (2013.01)

(58) Field of Classification Search
CPC .. B65D 81/3211; B65D 85/804; A47J 31/407; B67D 3/0019
USPC ........................................................ 426/115
See application file for complete search history.

(56) References Cited

U.S. PATENT DOCUMENTS

| 5,071,034 A * | 12/1991 | Corbiere ............... A61J 1/2089 206/222 |
| 5,878,915 A | 3/1999 | Gordon et al. |
| 6,165,523 A | 12/2000 | Story |
| 6,305,576 B1 | 10/2001 | Leoncavallo |
| 6,443,307 B1 | 9/2002 | Burridge |

(Continued)

FOREIGN PATENT DOCUMENTS

| WO | 2015170165 A2 | 11/2015 |
| WO | 2016097473 A1 | 6/2016 |

OTHER PUBLICATIONS

Written Opinion and International Search Report issued in International Patent Application No. PCT/US2019/035835, dated Aug. 27, 2019, 9 pages.

*Primary Examiner* — Viren A Thakur
*Assistant Examiner* — Chaim A Smith
(74) *Attorney, Agent, or Firm* — Sterne, Kessler, Goldstein & Fox P.L.L.C.

(57) ABSTRACT

A beverage ingredient pod for releasing beverage ingredients into a bottle to create a mixed beverage includes a liquid-ingredient chamber, a solid-ingredient chamber, a frangible membrane between and separating the liquid-ingredient chamber and the solid-ingredient chamber, and a rigid piercer that extends to a point toward the frangible membrane. Upon a force applied to the beverage ingredient pod, a portion of the pod collapses and drives the rigid piercer through the frangible membrane. This mixes contents of the liquid-ingredient chamber with contents of the solid-ingredient chamber and releases the mixed contents from the beverage ingredient pod into a bottle below that is filled with a liquid, creating a mixed beverage.

19 Claims, 14 Drawing Sheets

(56) References Cited

U.S. PATENT DOCUMENTS

| | | |
|---|---|---|
| 6,609,612 B2 | 8/2003 | Vlodek |
| 7,322,277 B2 | 1/2008 | Halliday et al. |
| 7,328,651 B2 | 2/2008 | Halliday et al. |
| 7,604,826 B2 | 10/2009 | Denisart et al. |
| 7,640,843 B2 | 1/2010 | Halliday et al. |
| 7,854,192 B2 | 12/2010 | Denisart et al. |
| 7,947,316 B2 | 5/2011 | Kirschner et al. |
| 7,951,109 B2 | 5/2011 | Anderson |
| 8,152,017 B2 | 4/2012 | Lizerbram et al. |
| 8,205,771 B2 | 6/2012 | Compton |
| 8,276,748 B2 | 10/2012 | Nyambi et al. |
| 8,393,261 B2 | 3/2013 | Kollep et al. |
| 8,443,970 B2 | 5/2013 | Coon |
| 8,490,786 B2 | 6/2013 | Rohr et al. |
| 8,501,254 B2 | 8/2013 | Wong et al. |
| 8,590,753 B2 | 11/2013 | Marina et al. |
| 8,672,154 B2 | 3/2014 | Seelhofer |
| 8,701,906 B1 | 4/2014 | Anderson |
| 8,795,748 B2 | 8/2014 | Kopel et al. |
| 8,852,659 B2 | 10/2014 | Halliday et al. |
| 9,079,706 B2 | 7/2015 | Glucksman et al. |
| 9,132,950 B1 | 9/2015 | Anderson et al. |
| 9,321,570 B2 | 4/2016 | Kim et al. |
| 2002/0179461 A1 | 12/2002 | Mollstam et al. |
| 2009/0020495 A1 | 1/2009 | Cheng |
| 2009/0078711 A1 | 3/2009 | Farone et al. |
| 2011/0174642 A1 | 7/2011 | Coon |
| 2011/0278184 A1* | 11/2011 | Middleman ............ A47G 21/00 206/222 |
| 2012/0183657 A1* | 7/2012 | Marina ............... B65D 85/8043 426/394 |
| 2013/0233444 A1 | 9/2013 | Guglielmini et al. |
| 2015/0072052 A1 | 3/2015 | Bartoli et al. |
| 2015/0135967 A1 | 5/2015 | Hoffman et al. |
| 2015/0183560 A1 | 7/2015 | Ginzburg et al. |
| 2015/0368033 A1 | 12/2015 | Krug et al. |
| 2017/0183146 A1 | 6/2017 | Marina et al. |
| 2018/0037392 A1 | 2/2018 | Schwalb et al. |

* cited by examiner

BEVERAGE INGREDIENT POD

BRIEF SUMMARY

Embodiments of the present invention provide beverage ingredient pods that can contain and be used to dispense multiple ingredients into conventional beverage bottles. They allow a user to create their own beverage at the point of use, and in doing so reduce waste and cost associated with production and delivery of pre-mixed bottled beverages. The pods include internal contained mechanisms for dispensing their contents.

For example, embodiments include a beverage ingredient pod for releasing beverage ingredients into a bottle where the pod includes a rigid cup defining a liquid-ingredient chamber, a frangible pouch defining a solid-ingredient chamber, a flexible dispensing funnel disposed around the frangible pouch, and a rigid piercer disposed at an opening of the flexible dispensing funnel. The frangible pouch is disposed across and seals an opening of the rigid cup, sealing the liquid-ingredient chamber. The rigid piercer extends to a point toward the frangible pouch so that when a force is applied to the cup while the opening of the dispensing funnel is held stationary (e.g., against a bottle opening), the flexible dispensing funnel collapses, causing the piercer to pierce through the frangible pouch and into the liquid-ingredient chamber. This releases contents of both the liquid-ingredient chamber and the solid-ingredient chamber through the opening of the flexible dispensing funnel. The contents mix with a liquid in the bottle to create a mixed beverage.

Embodiments also include a beverage ingredient pod for releasing beverage ingredients into a bottle where the pod includes a rigid cup defining a liquid-ingredient chamber, a collapsible chamber defining a solid-ingredient chamber and an exterior actuation surface, a separation membrane, a dispensing membrane, and a rigid piercer disposed within the solid-ingredient chamber. The separation membrane is disposed across and seals a first end of the rigid cup, separating the liquid-ingredient chamber and the solid-ingredient chamber. The dispensing membrane is disposed across and seals an opening at a second end of the rigid cup, sealing the liquid-ingredient chamber. The rigid piercer extends to a point toward the separation membrane, so that when a force is applied to the exterior actuation surface while the rigid cup is held stationary (e.g., against a bottle opening), the collapsible chamber collapses, causing the piercer to pierce through the separation membrane, releasing the contents of the solid-ingredient chamber into the liquid-ingredient chamber. The collapse of the collapsible chamber increases pressure within the rigid cup, which breaks the dispensing membrane, releasing the contents of both the liquid-ingredient chamber and the solid-ingredient chamber through the opening of the rigid cup. The contents mix with a liquid in the bottle to create a mixed beverage.

Embodiments also include a beverage ingredient pod for releasing beverage ingredients into a bottle where the pod includes a liquid-ingredient chamber, a solid-ingredient chamber, a frangible membrane, and a rigid piercer. The liquid-ingredient chamber is disposed adjacent to the solid-ingredient chamber. The frangible membrane is disposed between the liquid-ingredient chamber and the solid-ingredient chamber, separating the two chambers. The rigid piercer extends to a point toward the frangible membrane, so that when a force is applied to an exterior of the beverage ingredient pod while a portion of the beverage ingredient pod is held stationary (e.g., against a bottle opening), a portion of the beverage ingredient pod collapses. This causes the piercer to pierce through the frangible membrane, thereby mixing the contents of the liquid-ingredient chamber and the solid-ingredient chamber and releasing the mixed contents into the bottle. The contents mix with a liquid in the bottle to create a mixed beverage.

BRIEF DESCRIPTION OF THE FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

DETAILED DESCRIPTION

Figure 1:
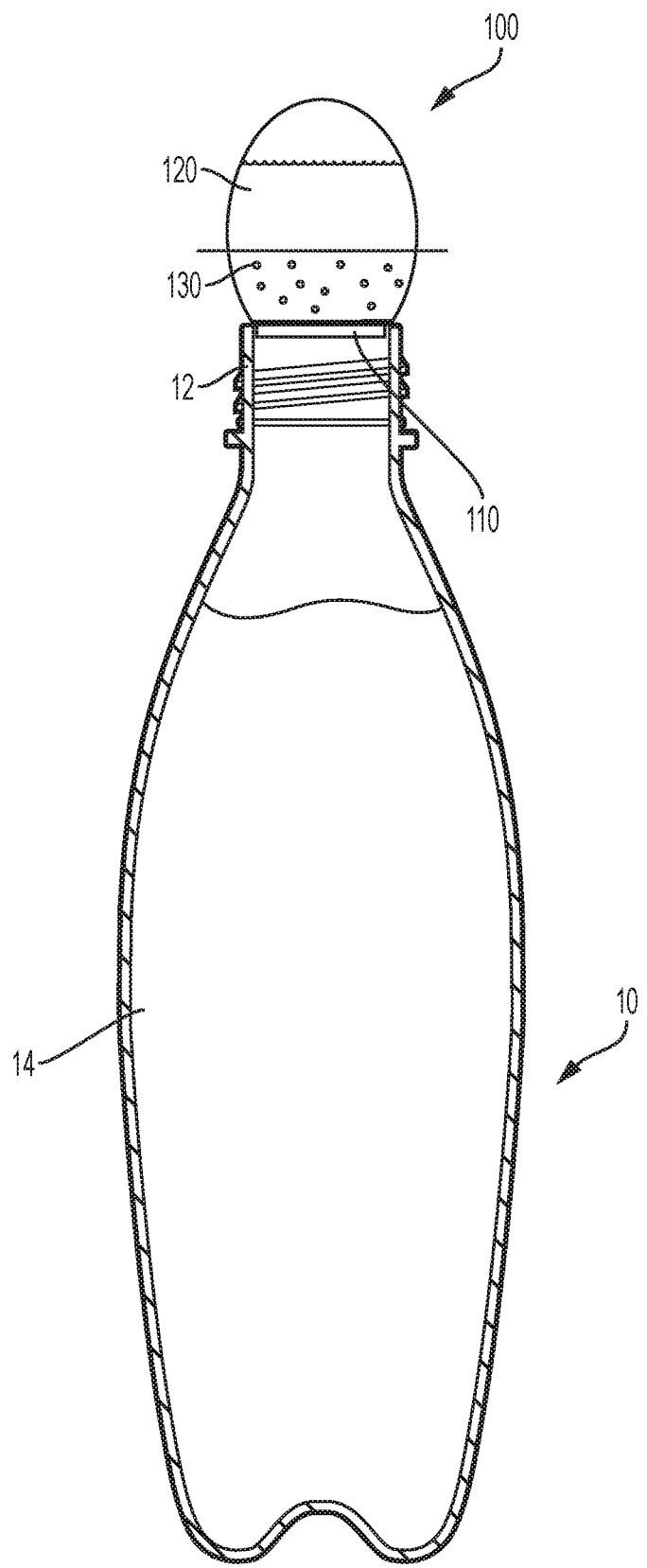
FIG. 1 is a partial sectional view of a beverage ingredient pod and a bottle.

The present invention(s) will now be described in detail with reference to embodiments thereof as illustrated in the accompanying drawings. References to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Pre-made beverages have long been distributed to consumers in various forms of packaging, often in plastic bottles. A significant proportion of such bottled pre-made beverages' weight and volume is often attributable to water, as a constituent part of the beverage. Significant proportions of production, shipping, storage, and other manufacturing and distribution costs are often derived from this volume and weight due to water content of a pre-made beverage.

Further, the disposal of the bottle containing the pre-made beverage after the beverage is consumed often involves recycling or other waste management processes applied to the bottle. The cost and complexity of such processes are often proportional to the volume of material forming the bottle.

Beverage ingredient pods as described herein may contain ingredients, such as concentrated flavorings, and may be used to create custom beverage mixtures by dispensing their contents into a bottle containing a liquid, such as water, juice, milk, or seltzer. Such pods may be smaller than conventional bottles, requiring less material and reducing potential manufacturing, distribution, and disposal complexity and cost. Further, such pods may allow users to create fresh beverage mixtures at the time of consumption, rather than consuming ingredients mixed at the time of beverage production. Allowing a consumer to participate in the creation of a new beverage may enhance consumer experience with an added perception of freshness.

Beverage ingredient pods according to embodiments of the invention may be used, for example, with a bottle that previously stored a pre-made beverage that has already been consumed. Such beverage ingredient pods may also be used with a purpose-built bottle configured to accept the pod and facilitate dispensing of the pod's contents. A single pod may be used with either bottle type, or with other bottles, as will be evident from the following description. Embodiments of the present invention provide flexibility to a consumer in creating a beverage at least by providing pods that include multiple separate ingredient chambers for storing ingredients (for example dry and liquid ingredients) separately that may be dispensed simultaneously into any conventional bottle in an easy and efficient manner.

To use beverage ingredient pods in accordance with some embodiments of the invention, a dispensing end of the beverage ingredient pod may be placed in the opening of a bottle containing a liquid. The user then presses down on the pod, which presses the pod against the opening of the bottle and collapses a portion of the pod. This collapse causes the beverage ingredients contained within the pod (flavorings and/or sweeteners, for example) to be dispensed from the pod into the bottle, creating a new, freshly mixed beverage for the consumer to enjoy. The collapse of the pod may cause the dispensing by driving an internal piercer of the pod through its internal chambers, or by creating a buildup of pressure within the pod that breaks open a membrane sealing its internal chambers.

Figure 2:
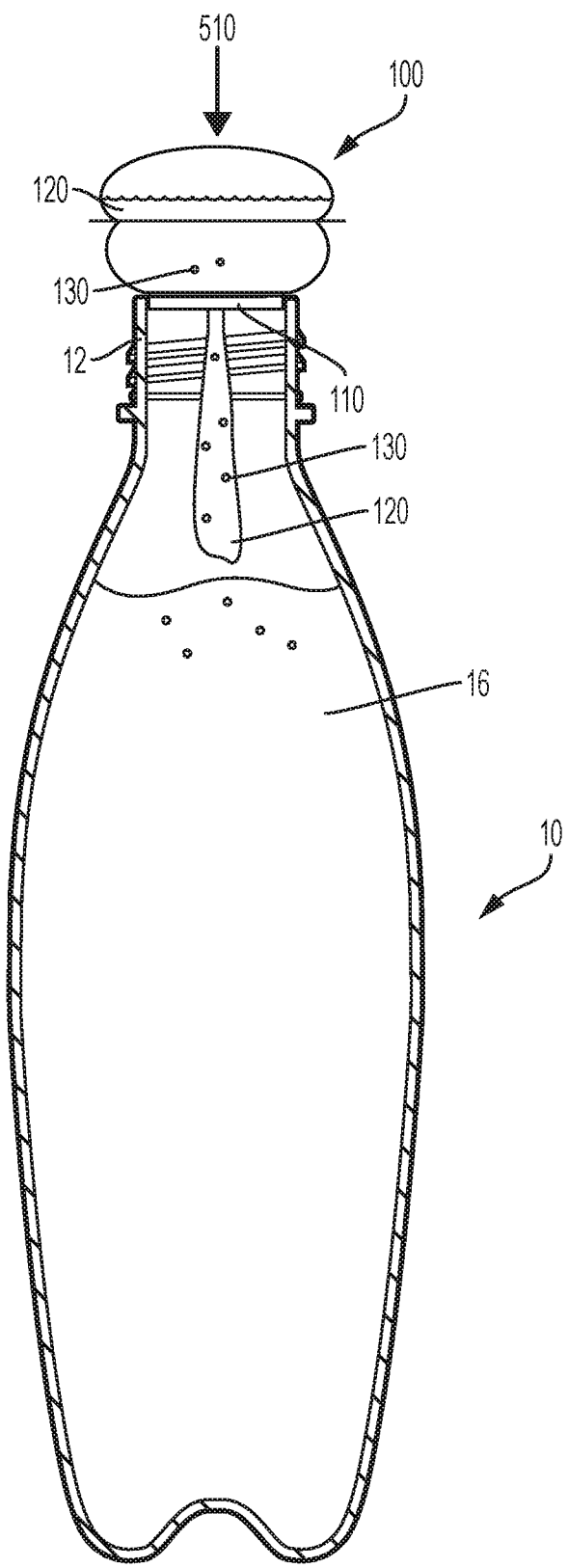
FIG. 2 is a partial sectional view of the beverage ingredient pod of FIG. 1 being dispensed into the bottle of FIG. 1.

Embodiments of the invention will now be described in more detail with reference to the figures. FIG. 1 shows a beverage ingredient pod 100 placed atop a bottle 10, the pod 100 having a dispensing end 110 placed in communication with an opening 12 (e.g., a neck finish) of the bottle 10. The beverage ingredient pod 100 may contain separately stored ingredients, such as a liquid beverage ingredient 120 and a solid beverage ingredient 130, and bottle 10 may contain a liquid 14 (e.g., water). As shown in FIG. 2, an axial force 510 may be applied to beverage ingredient pod 100, pushing pod 100 against bottle 10 and collapsing a portion of pod 100, thereby dispensing ingredients 120 and 130 into bottle 10 to mix with liquid 14, thereby creating a new beverage mixture 16.

As shown in FIGS. 3-5A, beverage ingredient pod 200 may include a rigid cup 240, a frangible pouch 250, a flexible dispensing funnel 260, and a rigid piercer 270. In some embodiments, all of the components of beverage ingredient pod 200 may be made from recyclable material. The material may be suitable for use in a variety of beverage production processes, such as hot-fill processing or aseptic processing.

Figure 4:
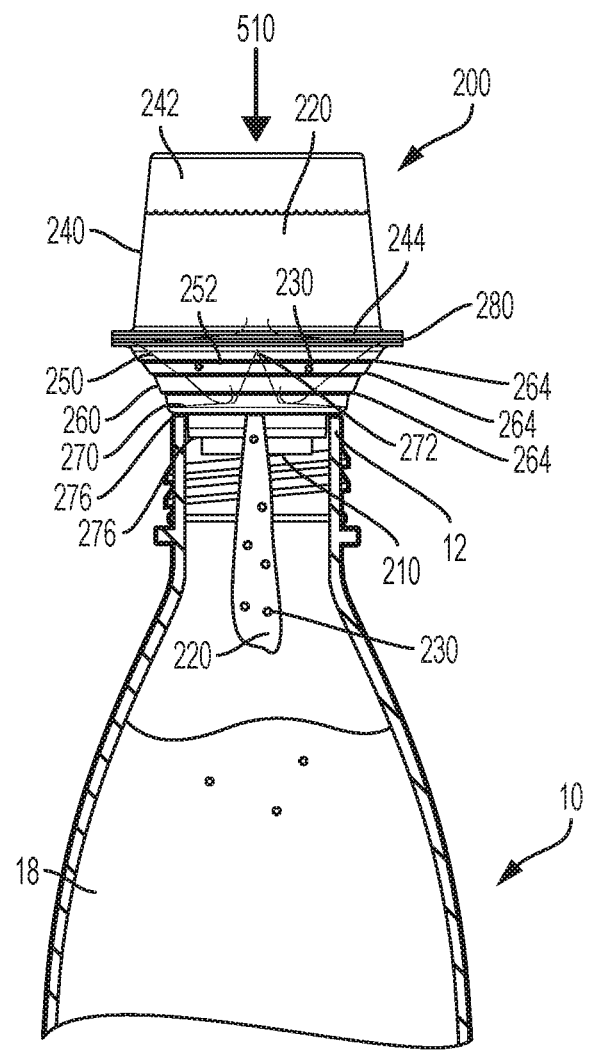
FIG. 4 is a partial sectional view of the beverage ingredient pod of FIG. 3 being dispensed into the bottle of FIG. 3.
Figure 5A:
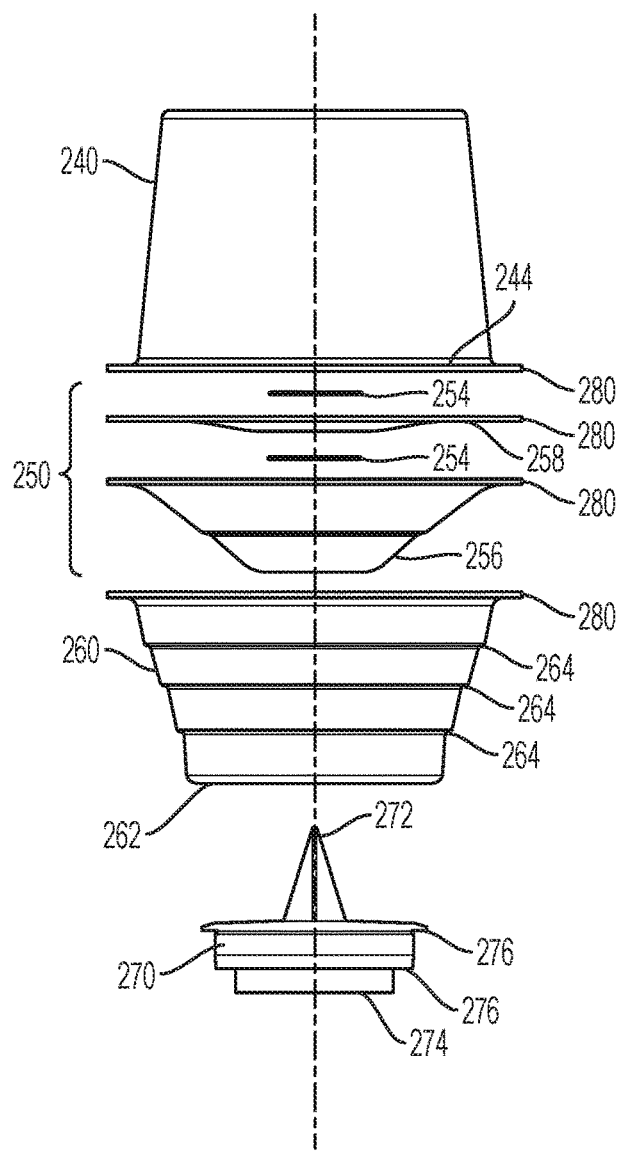
FIG. 5A is an exploded side view of the beverage ingredient pod of FIG. 3.
Figure 5B:
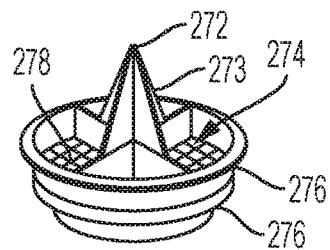
FIG. 5B is a perspective view of the piercer of the beverage ingredient pod of FIG. 3.

Rigid cup 240 may define a liquid-ingredient chamber 242 for containing a liquid beverage ingredient 220 (such as a flavoring, concentrated flavoring, syrup, or other fluid beverage additive) that may be dispensed from dispensing end 210 into bottle 10 to form a beverage mixture 18, as shown in FIG. 4. Rigid cup 240 is shown to have a frustoconical shape, however it may take other shapes as well, including, for example, cylindrical, spherical, or cubical, and it may or may not be symmetrical about any axis.

Frangible pouch 250 may define a solid-ingredient chamber 252, and may be disposed across an opening 244 in rigid cup 240, sealing opening 244 (and thereby sealing liquid-ingredient chamber 242). In some embodiments, opening 244 may be circular and have a diameter of approximately 40-65 millimeters. Solid-ingredient chamber 252 may contain a solid beverage ingredient 230 (such as, for example, a granulated sweetener, sugar, or other solid beverage additive) that may be dispensed from dispensing end 210 into bottle 10 to form a beverage mixture 18, as shown in FIG. 4. As with rigid cup 240, frangible pouch 250 is not limited to the shape and appearance shown, but may take a variety of shapes. In some embodiments, beverage ingredient pod 200 may include two or more frangible pouches 250 that may be pierced by rigid piercer 270 during a dispensing operation.

Flexible dispensing funnel 260 may be disposed around frangible pouch 250, and may share an annular rim 280 with rigid cup 240 and frangible pouch 250, such that rigid cup 240, frangible pouch 250, and flexible dispensing funnel 260 are sealed and fixed together along shared annular rim 280. Shared annular rim 280 may form, for example, an interface between rigid cup 240 and flexible dispensing funnel 260. In some embodiments, annular rim 280 may have an outer diameter of approximately 50-70 millimeters. Flexible funnel 260 may have a variety of shapes not limited to what is shown in the figures. Flexible funnel 260 may be cylindrical or frustoconical, for example. As described in more detail below, flexible funnel 260 may have a series of annular edges 264 that control the collapse of flexible funnel 260 in a dispensing operation.

Figure 3:
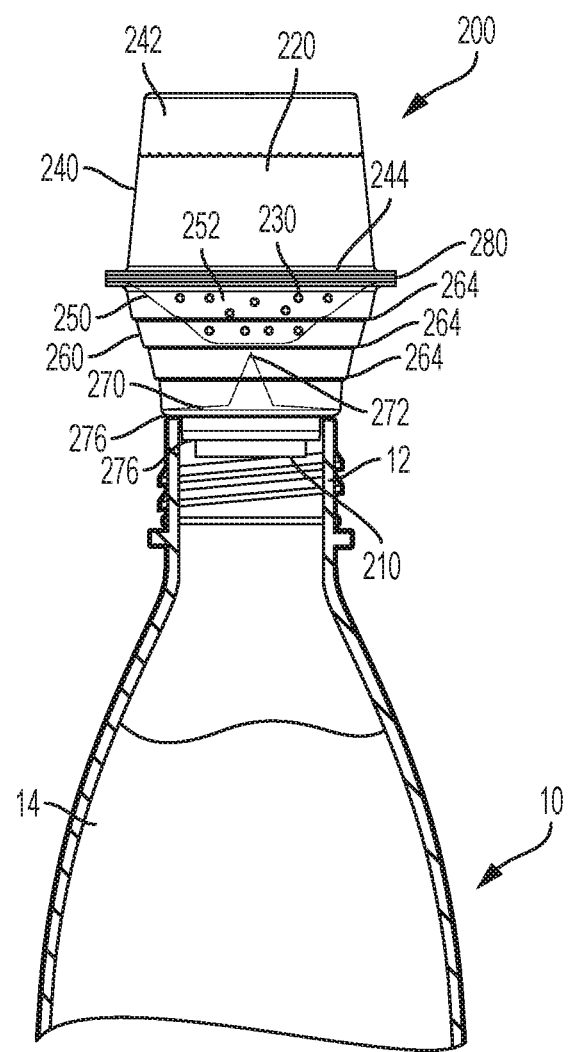
FIG. 3 is a partial sectional view of a beverage ingredient pod and a bottle.

Rigid piercer 270 may be fixed at an opening 262 (see FIG. 5A) in flexible funnel 260 opposite shared annular rim 280, and may extend to a point 272 in the direction of frangible pouch 250. As shown in FIGS. 3 and 4, in some embodiments, flexible funnel 260 may include a series of annular edges 264 that control the collapse of flexible funnel 260 in a dispensing operation. Annular edges 264 may form, for example, steps or weakened areas in the body of flexible funnel 260 so that flexible funnel 260 axially collapses along edges 264 in a controlled manner when axial force 510 is applied to beverage ingredient pod 200. This axial collapse causes frangible pouch 250 to move toward and be pierced through by rigid piercer 270, thereby releasing the contents of frangible pouch 250 and rigid cup 240 in a dispensing operation. As shown in FIG. 4, point 272 of rigid piercer 270 extends through multiple walls of frangible pouch 250 and into liquid-ingredient chamber 242.

In some embodiments, piercing portion 273 (see FIG. 5B) of rigid piercer 270 may have a generally triangular shape, terminating at point 272, however other shapes or structures capable of piercing frangible pouch 250 in the manner described may be used. Although shown in FIGS. 3-5A as a series of collapsible edges 264, flexible dispensing funnel 260 may take other forms that allow for similar actuation of frangible pouch 250 with respect to rigid piercer 270, for example, a surface with a grid of weakened areas (e.g., edges) that allow flexible dispensing funnel 260 to collapse in a controlled manner when an axial force 510 is applied to the beverage ingredient pod 200.

Rigid piercer 270 may be positioned at dispensing end 210 of pod 200 and have a dispensing opening 274 (e.g., a beverage ingredient outlet with a circular cross-section) (see FIGS. 5A and 5B) whereby ingredients may pass from pod 200 into bottle 10 in a dispensing operation. In some embodiments, dispensing opening 274 may be formed at least in part by an outer cylindrical rim, and may have a diameter of less than approximately 50 millimeters, (e.g., between 26-38 millimeters). Dispensing opening 274 may be intersected by piercing portion 273 including elements of piercing portion 273 that support piercing portion 273 centrally with respect to dispensing opening 274. In some embodiments rigid piercer 270 includes a filter 278 disposed within dispensing opening 274. Filter 278 may be, for example, a mesh screen, and beverage ingredients 220, 230 may pass through filter 278 before being dispensed from beverage ingredient pod 200.

Figure 6:
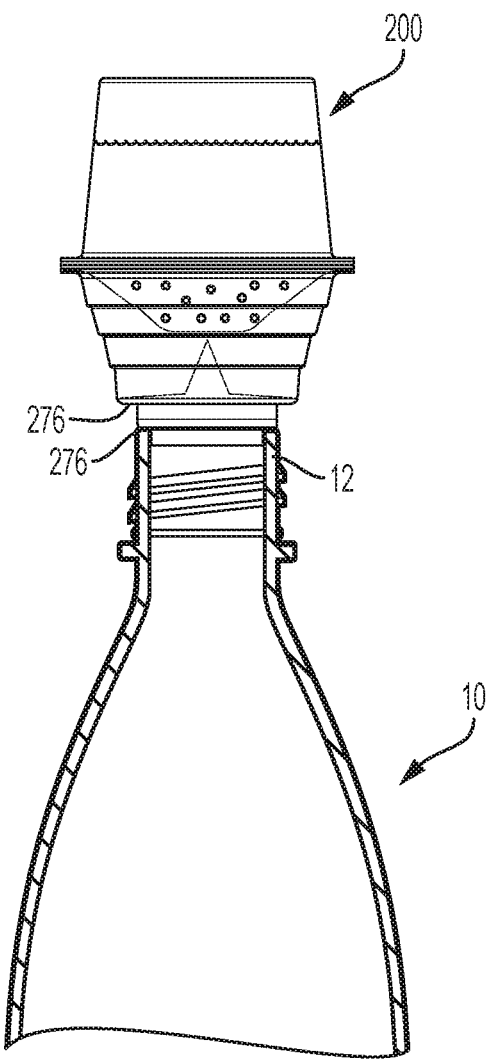
FIG. 6 is a partial sectional view of the beverage ingredient pod of FIG. 3 and a bottle.

As shown, for example, in FIG. 3, rigid piercer 270 may also have annular seating surfaces 276 disposed around and axially displaced at intervals from dispensing opening 274. An annular seating surface 276 may be, for example, disposed inward and axially displaced from another annular seating surface 276. The annular seating surfaces 276 allow beverage ingredient pod 200 to register against bottle opening 12, thereby, maintaining alignment between beverage ingredient pod 200 and bottle 10. The annular seating surfaces 276 allow beverage ingredient pod 200 to be seated securely on a range of differently sized bottles (compare FIG. 3 with FIG. 6, for example). Each of annular seating surfaces 276 may have an inside diameter of less than approximately 50 millimeters (e.g., between 26-38 millimeters) with a respective outside diameter that may be approximately 1-5 millimeters greater than the inside diameter, forming a surface of 1-5 millimeters in width. Annular seating surfaces 276 may have complete circular shapes so as to be able to seat around the entire opening of a bottle, thereby forming a seal between the interior of the bottle and the interior of the beverage ingredient pod 200.

As shown in FIGS. 3 and 4, with one seating surface 276 in communication with opening 12 of bottle 10, an axial force 510 applied to rigid cup 240 will cause flexible dispensing funnel 260 to collapse, displacing rigid cup 240 and frangible pouch 250 toward piercer 270, which is held stationary relative to bottle 10 at one end of funnel 260. Rigid cup 240 may have sufficient rigidity to maintain its shape through the application of force 510 that causes flexible funnel 260 to collapse. As frangible pouch 250 moves toward piercer 270, point 272 of piercer 270 pierces through a first wall 256 (see FIG. 5A) of frangible pouch 250 and opens solid-ingredient chamber 252. As funnel 260 continues to collapse, point 272 of piercer 270 pierces through a second wall 258 (see FIG. 5A) of frangible pouch 250, releasing the contents of liquid-ingredient chamber 242. The first and second walls 256, 258 of frangible pouch 250 may be sufficiently fragile or otherwise biased to break under tensile stress so that rigid piercer 270 may pierce and pass through frangible pouch 250. Rigid piercer 270 may have sufficient rigidity to maintain its shape as it pierces and passes through frangible pouch 250. In some embodiments, frangible pouch 250 may include weakened membranes 254 forming parts of the first and second walls 256, 258 (see FIG. 5A), which are more apt to break than their surrounding walls when pressure is applied to their surface by rigid piercer 270, thereby controlling the areas at which frangible pouch 250 breaks, and making such breaking require less force. In some embodiments, the magnitude of axial force 510 that is necessary to dispense the ingredients from beverage ingredient pod 200 into bottle 10 may be less than 30 kilograms-force.

After liquid-ingredient chamber 242 has been pierced, liquid ingredients 220 are first drawn by gravity through solid-ingredient chamber 252, then through funnel 260 and dispensing opening 274, and finally into bottle 10. Solid ingredients 230 not dispensed by, the force of gravity may be washed out by liquid ingredients 220 as they pass through solid-ingredient chamber 252. In this way, liquid ingredients 220 and solid ingredients 230 may begin to mix even before they exit beverage ingredient pod 200. After they exit, liquid ingredients 220 and solid ingredients 230 mix with liquid 14 within bottle 10 (see FIG. 3) to create beverage mixture 18 (see FIG. 4).

In some embodiments, a removable seal is disposed over dispensing opening 274 to seal interior airspace of flexible dispensing funnel 260 until beverage ingredient pod 200 is to be used. A user may peel off or otherwise remove the removable seal before initiating beverage creation.

In some embodiments, a temporary seal may be formed between a seating surface 276 and bottle opening 12 (e.g., due to the application of force 510), such that bottle 10 and beverage ingredient pod 200, when held together by a user, can be shaken or otherwise moved without spilling liquid in order to further mix the ingredients that have been dispensed from the pod with the liquid in the bottle, and to rinse remaining ingredients out of beverage ingredient pod 200 and into the resulting beverage mixture 18.

Figure 7:
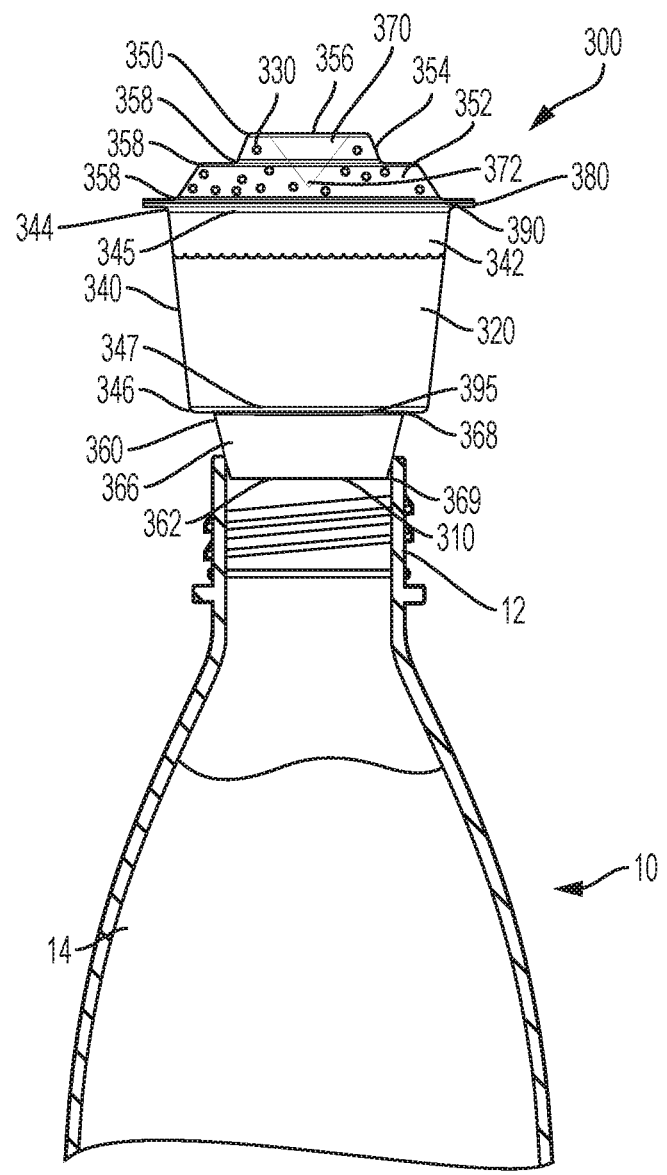
FIG. 7 is a partial sectional view of a beverage ingredient pod and a bottle.
Figure 8:
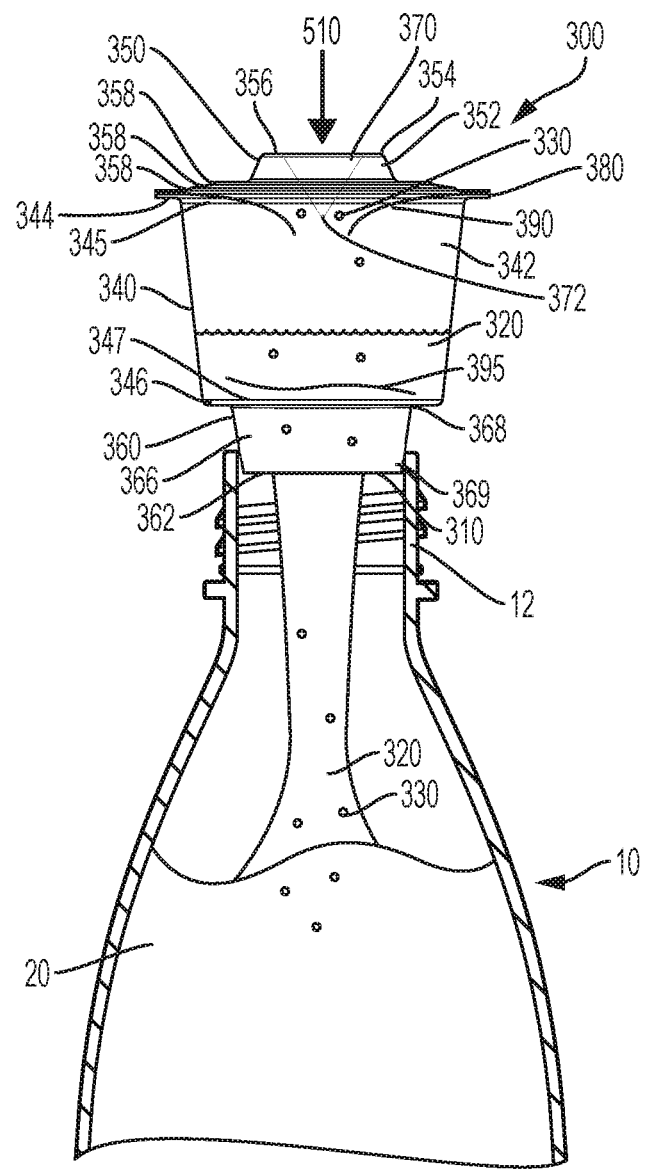
FIG. 8 is a partial sectional view of the beverage ingredient pod of FIG. 7 being dispensed into the bottle of FIG. 7.
Figure 9:
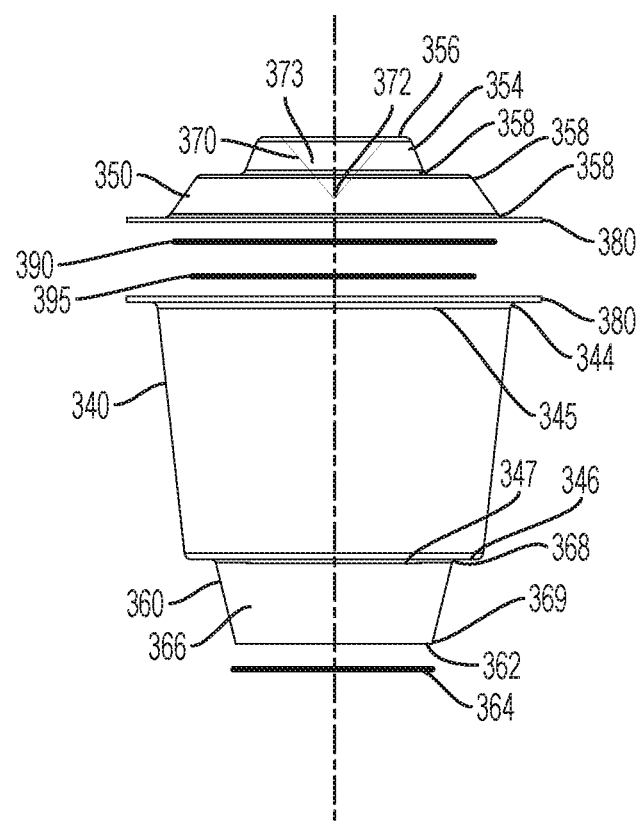
FIG. 9 is an exploded side view of the beverage ingredient pod of FIG. 7.
Figure 10:
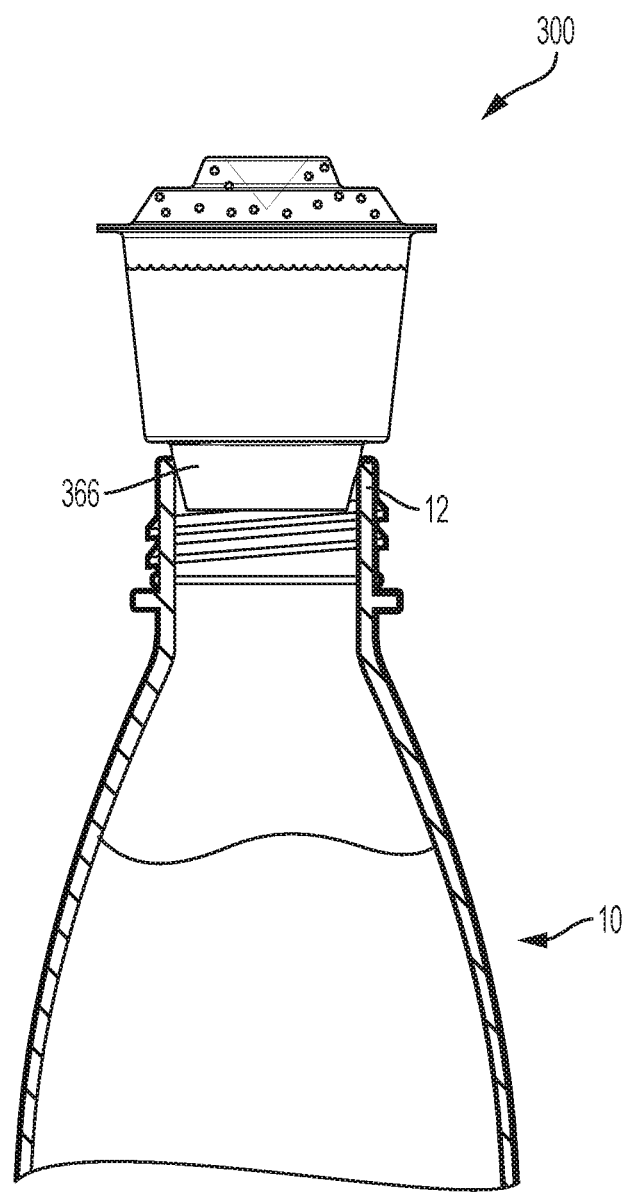
FIG. 10 is a partial sectional view of the beverage ingredient pod of FIG. 7 and a bottle.

FIGS. 7-10 show another example of a beverage ingredient pod according to an embodiment of the invention. As shown in FIGS. 7-9, beverage ingredient pod 300 may include a rigid cup 340, a collapsible chamber 350, a separating membrane 390, a dispensing membrane 395, a funnel 360, and a rigid piercer 370. In some embodiments, all of the components of beverage ingredient pod 300 may be made from recyclable material. The material may be suitable for use in a variety of beverage production processes, such as hot-fill processing or aseptic processing.

Rigid cup 340 may define a liquid-ingredient chamber 342 for containing a liquid beverage ingredient 320 (such as a flavoring, concentrated flavoring, syrup, or other fluid beverage additive) that may be dispensed from dispensing end 310 into bottle 10 to form a beverage mixture 20, as shown in FIG. 8. Rigid cup 340 is shown to have a frustoconical shape, however it may take other shapes as well, including, for example, cylindrical, spherical, or cubical, and it may or may not be symmetrical about any axis.

Collapsible chamber 350 may define a solid-ingredient chamber 352 for containing a solid beverage ingredient 330 (such as, for example, a granulated sweetener, sugar, or other solid beverage additive) that may be dispensed from dispensing end 310 into bottle 10 to form a beverage mixture 20, as shown in FIG. 8. As with rigid cup 340, collapsible chamber 350 is not limited to the shape and appearance shown, but may take a variety of shapes. Collapsible chamber 350 may share an annular rim 380 with rigid cup 340 such that a first end 344 of rigid cup 340 and collapsible chamber 350 are sealed and fixed together along shared annular rim 380. In some embodiments, annular rim 380 may have an outer diameter of approximately 40-70 millimeters.

Separating membrane 390 may be disposed across an opening 345 at first end 344 of rigid cup 340, sealing first end 344 (and thereby separating liquid-ingredient chamber 342 and solid-ingredient chamber 352). In some embodiments, opening 345 may be circular and have a diameter of approximately 25-55 millimeters. In some embodiments, beverage ingredient pod 300 may include three or more solid and/or liquid-ingredient chambers 342, 352 that are separated by two or more separating membranes 390 that may be pierced by rigid piercer 370 during a dispensing operation.

Dispensing membrane 395 may be disposed across an opening 347 at a second end and base 346 of rigid cup 340, sealing second end and base 346 of rigid cup 340. In some embodiments, opening 347 may be circular and have a diameter less than an outer diameter of second end and base 346 of rigid cup 340. For example, the diameter of opening 347 may be approximately 10-40 millimeters. Dispensing membrane 395 may be sealed to an internal bottom surface of rigid cup 340, as shown, for example, in FIG. 7 (see also FIG. 9). As described in more detail below, dispensing membrane 395 (or the seal between dispensing membrane 395 and rigid cup 340) may be broken by application of a pressure to its surface by liquid ingredient 320 during a dispensing operation, in some embodiments, certain areas of dispensing membrane 395 may be weakened and more apt to break than their surrounding areas when such pressure is applied.

Funnel 360 may be disposed at the second end and base 346 of rigid cup 340. In this position dispensing membrane 395 separates funnel 360 from liquid-ingredient chamber 342. Funnel 360 may have a variety of shapes not limited to what is shown in the figures. As shown in FIGS. 7-9, funnel 360 may be frustoconical and may have an upper end 368 with a diameter that is greater than a lower, dispensing end 369, forming a tapering exterior surface 366. Tapering exterior surface 366 allows beverage ingredient pod 300 to register against bottle opening 12, thereby maintaining alignment between beverage ingredient pod 300 and bottle 10. Tapering exterior surface 366 allows beverage ingredient pod 300 to be seated securely on a range of differently sized bottles (compare FIG. 7 with FIG. 10, for example). In some embodiments, the diameter of upper end 368 is less than approximately 50 millimeters, and the diameter of dispensing end 369 is greater than approximately 15 millimeters. As shown, the diameter decreases linearly between the upper and dispensing ends 368, 369 to accommodate different bottle opening sizes at any point along the height of funnel 360.

Dispensing end 369 of funnel 360 may have a dispensing opening 362 (e.g., a beverage ingredient outlet with a circular cross-section), whereby ingredients may be dispensed from beverage ingredient pod 300 into bottle 10. In some embodiments, a filter 364 is disposed within or at an end of funnel 360. Filter 364 may be, for example, a mesh screen, and beverage ingredients 320, 330 may pass through filter 364 before being dispensed from beverage ingredient pod 300.

Rigid piercer 370 may be disposed within solid-ingredient chamber 352, as shown, for example, in FIG. 7, and may extend to a point 372 in the direction of separating membrane 390. Collapsible chamber 350 may have an exterior wall 354 that defines an exterior actuation surface 356. In some embodiments, rigid piercer 370 may be coupled to exterior wall 354 within solid-ingredient chamber 352. As shown in FIGS. 7 and 8, in some embodiments, exterior actuation surface 356 may include a series of annular edges 358 that control the collapse of collapsible chamber 350 in a dispensing operation. Annular edges 358 may form, for example, steps or weakened areas in the exterior wall 354 of collapsible chamber 350 so that collapsible chamber 350 axially collapses along edges 358 when axial force 510 is applied to exterior actuation surface 356. This collapse causes rigid piercer 370 to move toward and pierce separating membrane 390, thereby breaking the seal between solid-ingredient chamber 352 and liquid-ingredient chamber 342 in a dispensing operation. This collapse also reduces the combined internal volume of rigid cup 340 and collapsible chamber 350, thereby, increasing the pressure within the rigid cup, which breaks the seal of dispensing membrane 395. Although shown in FIGS. 7-9 as a series of collapsible edges 358, exterior actuation surface 356 may take other forms that allow for similar actuation, for example, a single collapsible surface with sufficient flexibility to allow rigid piercer 370 to pierce separating membrane 390 and with sufficient volume displacement capacity to break dispensing membrane 395.

In some embodiments, piercing portion 373 (see FIG. 9) of rigid piercer 370 may have a generally triangular shape, terminating at a point 372, however other shapes or structures capable of piercing separating membrane 390 in the manner described may be used.

As shown in FIGS. 7 and 8, with the exterior surface 366 of funnel 360 in communication with opening 12 of bottle 10, an axial force 510 applied to exterior actuation surface 356 will cause collapsible chamber 350 to collapse, displacing rigid piercer 370 toward separating membrane 390, which is held stationary relative to bottle 10 by rigid cup 340. As rigid piercer 370 moves toward separating membrane 390, point 372 of piercer 370 pierces through separating membrane 390, releasing the contents of solid-ingredient chamber 352 into liquid-ingredient chamber 342. Separating membrane 390 may be sufficiently fragile or otherwise biased to break under tensile stress so that rigid piercer 370 may pierce and pass through separating membrane 390. Rigid piercer 370 may have sufficient rigidity to maintain its shape as it pierces and passes through separating membrane 390.

After separating membrane 390 has been pierced, the collapse of collapsible chamber 350 causes an increase in pressure in rigid cup 340. The pressure increase is transmitted by liquid ingredient 320 to the surface of dispensing membrane 395, thereby causing dispensing membrane 395 (or its seal with rigid cup 340) to break as a result of the pressure increase, releasing the contents of both the liquid and solid ingredient chambers 342, 352 into and through funnel 360. Dispensing membrane 395 may be sufficiently fragile or otherwise biased to break or partially separate from rigid cup 340 under pressure so that the pressure increase from the collapse of collapsible chamber 350 will cause dispensing membrane 395 to break or partially separate from rigid cup 340 without the physical contribution of any implement (e.g. the rigid piercer 370) coming into contact with dispensing membrane 395. Rigid cup 340 may have sufficient rigidity to maintain its shape through the application of force 510 that causes collapsible chamber 350 to collapse and to withstand the pressure increase caused by the collapse of collapsible chamber 350. In some embodiments, the magnitude of axial force 510 that is necessary to dispense the ingredients from beverage ingredient pod 300 into bottle 10 may be less than 30 kilograms-force.

After separating membrane 390 has been pierced, solid ingredients 320 are first drawn by gravity, or pushed by the exterior wall 354 of collapsible chamber 350, into liquid-ingredient chamber 342. In this way, liquid ingredients 320 and solid ingredients 330 may begin to mix even before they exit beverage ingredient pod 300. After dispensing membrane 395 (or its seal with rigid cup 340) has been broken, the solid and liquid ingredients 320, 330 may pass through the funnel 360 and dispensing opening 362, and finally into bottle 10 to mix with liquid 14 within bottle 10 (see FIG. 7) to create beverage mixture 20 (see FIG. 8).

In some embodiments, a removable seal is disposed over dispensing opening 362 to seal interior airspace of funnel 360 until beverage ingredient pod 300 is to be used. A user may peel off or otherwise remove the removable seal before initiating beverage creation.

In some embodiments, a temporary seal may be formed between exterior surface 366 of funnel 360 and bottle opening 12 (e.g., due to the application of force 510), such that bottle 10 and beverage ingredient pod 300, when held together by a user, can be shaken or otherwise moved without spilling liquid in order to further mix the ingredients that have been dispensed from the pod with the liquid in the bottle, and to rinse remaining ingredients out of beverage ingredient pod 300 and into the resulting beverage mixture 20.

While embodiments of the present invention may be used to dispense ingredients into any conventional bottle in an easy and efficient manner as described above, the beverage ingredient pods may also have the versatility to be used in purpose-built bottles or in other purpose-built dispensing equipment, such as an automatic drink dispenser. A purpose-built bottle may fully or partially enclose a pod and may contain internal structure to receive and support a pod and to apply a force to the pod, thereby causing the pod to dispense its contents into the purpose-built bottle in a dispensing operation. The pod may or may not then remain in the purpose-built bottle while the beverage mixture is being consumed. Similarly, a purpose-built dispenser may fully or partially enclose a pod and may include structure to receive and support a pod and to apply a force (automatically, or through direct or indirect input from a user) to the pod, thereby causing the pod to dispense its contents in a dispensing operation.

As shown in FIGS. 11-14, a purpose-built bottle 400 may include an upper portion 410 and a lower portion 420. Upper portion 410 may include a rigid force applicator 412, which may apply axial force 510 to a pod during a dispensing operation as described above. Lower portion 420 may include a rigid support 422, which may support a pod during a dispensing operation in a manner similar to bottle opening 12 as described above.

Figure 11:
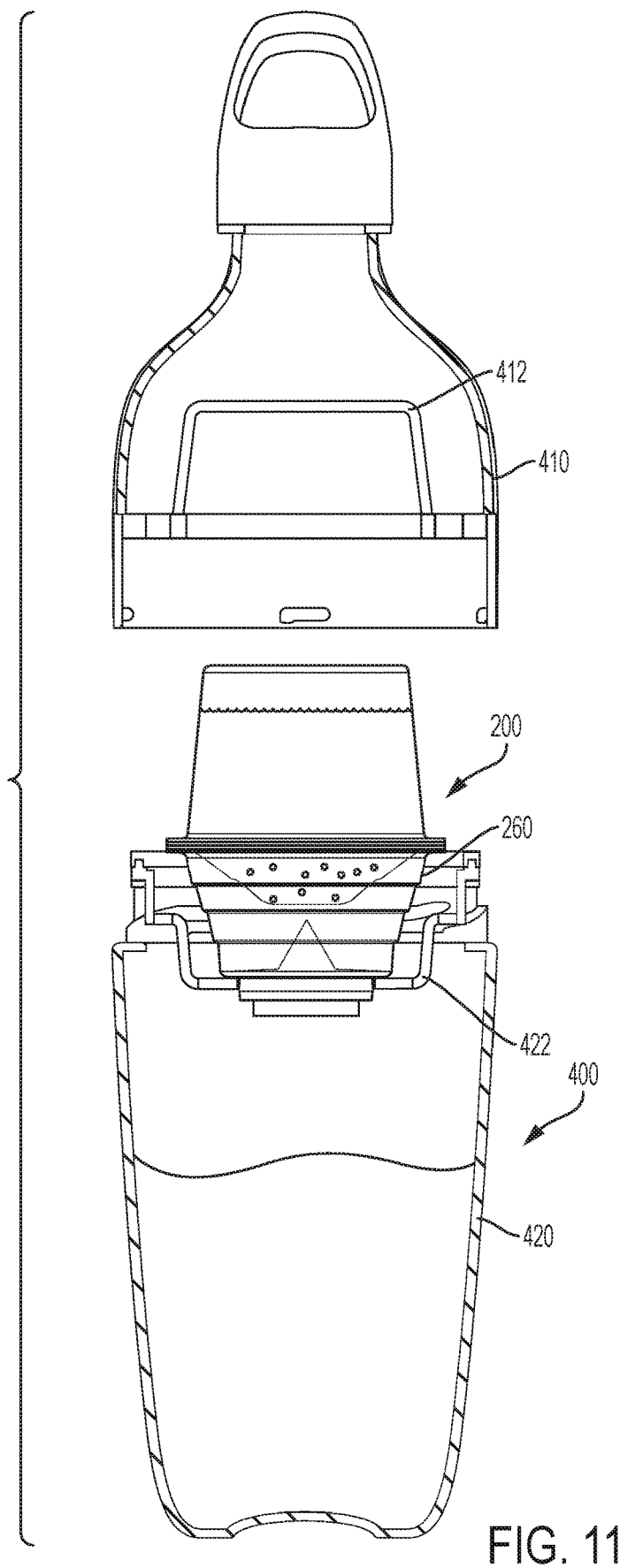
FIG. 11 is a partial sectional view of the beverage ingredient pod of FIG. 3 and a bottle.
Figure 12:
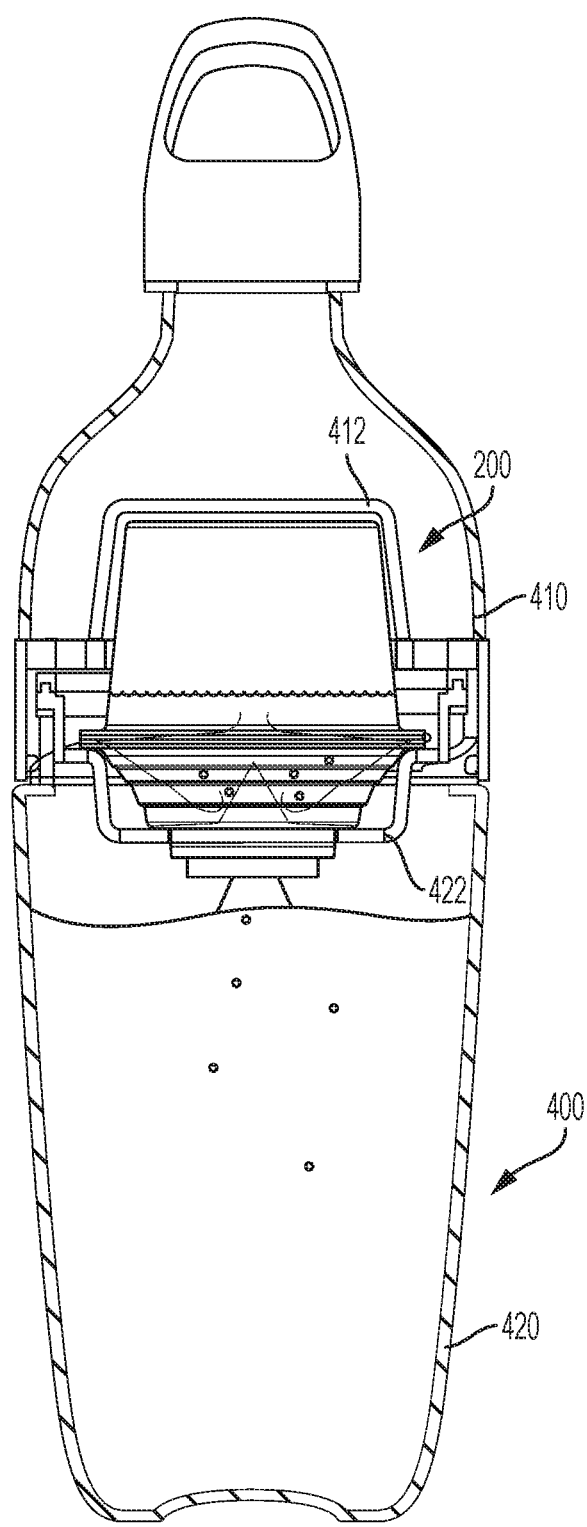
FIG. 12 is a partial sectional view of the beverage ingredient pod of FIG. 3 being dispensed into the bottle of FIG. 11.
Figure 13:
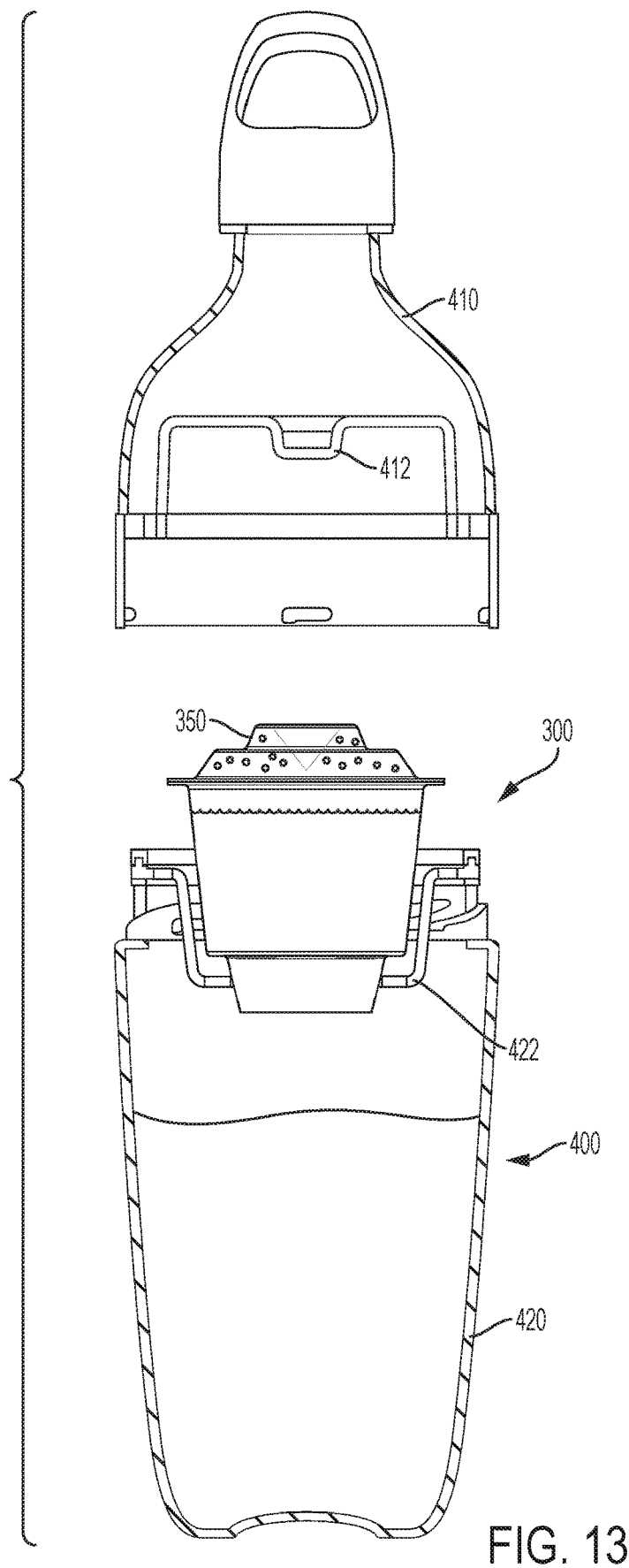
FIG. 13 is a partial sectional view of the beverage ingredient pod of FIG. 7 and a bottle.
Figure 14:
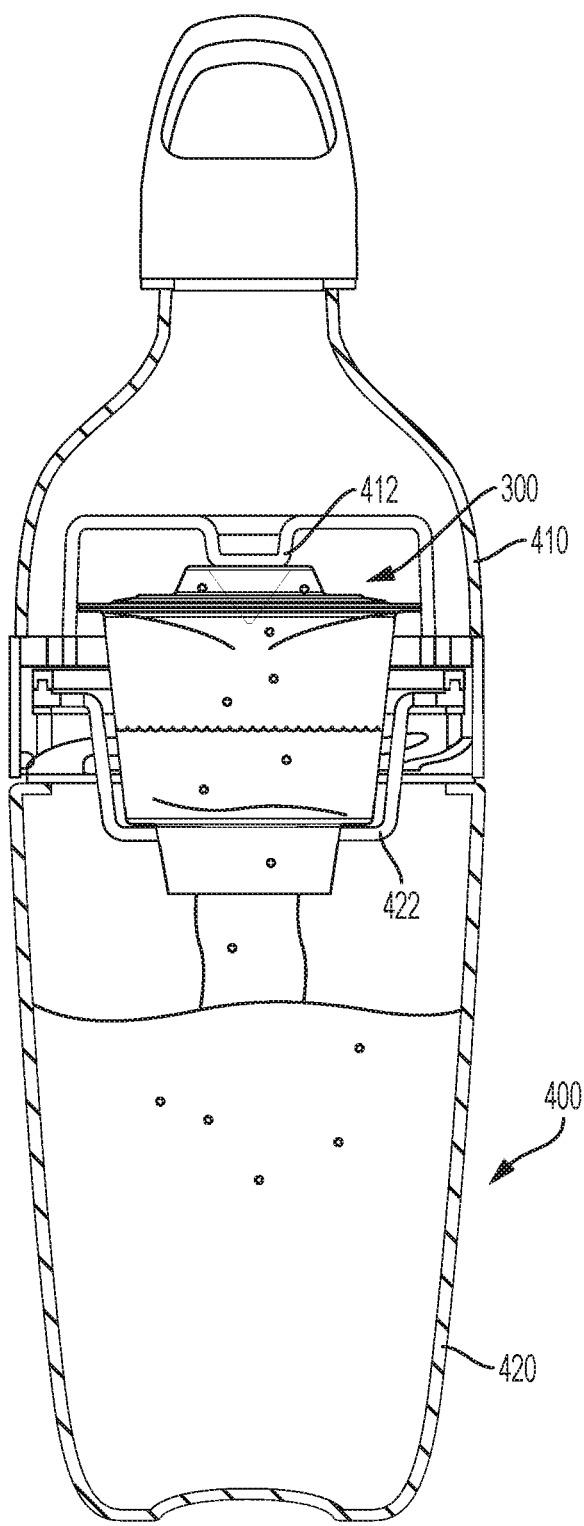
FIG. 14 is a partial sectional view of the beverage ingredient pod of FIG. 7 being dispensed into the bottle of FIG. 13.

As shown in FIGS. 11 and 12, when upper portion 410 and lower portion 420 are moved and connected together, rigid force applicator 412 presses beverage ingredient pod 200 against rigid support 422, causing flexible dispensing funnel 260 to collapse, thereby initiating the dispensing operation described above. Similarly, as shown in FIGS. 13 and 14, when upper portion 410 and lower portion 420 are moved together, rigid force applicator 412 presses beverage ingredient pod 300 against rigid support 422, causing collapsible chamber 350 to collapse, thereby initiating the dispensing operation described above. Rigid force applicator 412 and rigid support 422 have sufficient rigidity to maintain their respective shapes during a pod dispensing operation. The moving together of upper portion 410 and lower portion 420 may be accomplished in a variety of ways, including, for example, screwing upper portion 410 onto lower portion 410 using a threaded connection therebetween, rotating upper portion 410 into place on lower portion 420 by a hinged connection therebetween, or pressing upper portion 410 together with lower portion 420 such that they secure together by, for example, a latch mechanism.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A beverage ingredient pod for releasing beverage ingredients into a bottle, the beverage ingredient pod comprising:
    a rigid cup defining a liquid-ingredient chamber;
    a flexible wall defining a solid-ingredient chamber;
    a separation membrane sealing a first end of the rigid cup, disposed between and separating the liquid-ingredient chamber and the solid-ingredient chamber;
    a dispensing membrane sealing a second end of the rigid cup opposite the first end; and
    a rigid piercer disposed within the solid-ingredient chamber, wherein the rigid piercer extends to a point toward the separation membrane.

2. The beverage ingredient pod of claim 1, wherein the flexible wall defines an exterior actuation surface of the beverage ingredient pod,
    wherein upon a force applied to the exterior actuation surface while the rigid cup is held stationary, the flexible wall collapses, thereby causing the rigid piercer to pierce through the separation membrane, and
    wherein the collapse of the flexible wall increases pressure within the rigid cup, which breaks the dispensing membrane or a seal of the dispensing membrane.

3. The beverage ingredient pod of claim 1, further comprising a funnel connected to the rigid cup, wherein the funnel is separated from the liquid-ingredient chamber by the dispensing membrane, wherein the funnel tapers to a diameter less than 38 mm.

4. The beverage ingredient pod of claim 1, wherein the flexible wall defines an exterior actuation surface of the beverage ingredient pod, and wherein the rigid piercer is coupled to the flexible wall.

5. The beverage ingredient pod of claim 1, wherein the dispensing membrane is sealed to the rigid cup around an opening of the second end of the rigid cup, wherein the dispensing membrane is configured to break upon an increase of pressure within the rigid cup of no more than an amount caused by the collapse of the flexible wall into the rigid cup.

6. The beverage ingredient pod of claim 1, further comprising a funnel connected to the rigid cup, and wherein, in an orientation above a bottle for releasing its contents into the bottle, the rigid cup is disposed below the flexible wall, and the funnel is disposed below the rigid cup.

7. A beverage ingredient pod containing beverage ingredients to be dispensed into a bottle, the beverage ingredient pod comprising:

a rigid cup having a first end opposite a second end, wherein the first end comprises an opening and a laterally extending annular rim defining a liquid-ingredient chamber in which a liquid beverage ingredient is disposed;

a frangible pouch having a laterally extending annular rim defining a solid-ingredient chamber in which a solid beverage ingredient is disposed, wherein the frangible pouch is external to and adjacent to the rigid cup and the laterally extending annular rim of the frangible pouch is disposed across and seals the opening of the rigid cup, thereby sealing the liquid-ingredient chamber;

a flexible dispensing funnel having a narrower end and a wider end, wherein the wider end is disposed around the frangible pouch and is fixed to the laterally extending annular rim of the rigid cup; and a rigid piercer fixed to the narrower end of the flexible dispensing funnel, wherein the rigid piercer extends to a point toward the frangible pouch.

8. The beverage ingredient pod of claim 7, wherein upon a force applied to the rigid cup while the rigid piercer is held stationary, the flexible dispensing funnel collapses, thereby causing the rigid piercer to pierce through the frangible pouch and into the liquid-ingredient chamber, releasing the liquid beverage ingredient from the liquid-ingredient chamber and the solid beverage ingredient from the solid-ingredient chamber through an opening of the flexible dispensing funnel.

9. The beverage ingredient pod of claim 7, wherein the flexible dispensing funnel is stepped, and wherein an axial force applied to the beverage ingredient pod causes the flexible dispensing funnel to collapse axially.

10. The beverage ingredient pod of claim 7, wherein the rigid piercer defines a dispensing opening of the beverage ingredient pod.

11. The beverage ingredient pod of claim 7, wherein the rigid piercer defines a dispensing opening of the beverage ingredient pod, wherein the rigid piercer further comprises first and second annular seating surfaces for seating the beverage ingredient pod against an opening of a bottle, wherein the second annular seating surface is disposed inwardly of and axially displaced from the first annular seating surface, and wherein the dispensing opening is disposed inwardly of and axially displaced from the second annular seating surface.

12. The beverage ingredient pod of claim 7, wherein, in an orientation above a bottle for releasing beverage ingredients into the bottle, the flexible dispensing funnel is disposed below the rigid cup, the frangible pouch is disposed at an interface between the rigid cup and the flexible dispensing funnel, and the rigid piercer is disposed below the frangible pouch.

13. A beverage ingredient pod containing beverage ingredients to be dispensed into a bottle, the beverage ingredient pod comprising:

a first ingredient chamber, the first ingredient chamber having a first end and a second end opposite the first end, the first end defining an opening and having a laterally extending annular rim;

a second ingredient chamber having a laterally extending annular rim disposed adjacent to and external to the first ingredient chamber and fixed to the laterally extending annular rim of the first ingredient chamber;

a frangible membrane disposed between and separating the first ingredient chamber and the second ingredient chamber; and a rigid piercer within the beverage ingredient pod that extends to a point toward the frangible membrane;

wherein upon a force applied to an exterior of the beverage ingredient pod, a portion of the beverage ingredient pod collapses causing the rigid piercer to pierce the frangible membrane, thereby mixing a first beverage ingredient in the first ingredient chamber with a second beverage ingredient in the second ingredient chamber and releasing the first and second beverage ingredients from the beverage ingredient pod.

14. The beverage ingredient pod of claim 13, further comprising a flexible dispensing funnel having a narrower end and a wider end, wherein the rigid piercer is coupled to the narrower end of the flexible dispensing funnel.

15. The beverage ingredient pod of claim 13, further comprising a second membrane sealing the first ingredient chamber, wherein the collapse of the flexible wall increases pressure within the beverage ingredient pod, and wherein the increased pressure causes the second membrane or the seal of the second membrane to break, thereby releasing the first and second beverage ingredients from the beverage ingredient pod.

16. The beverage ingredient pod of claim 13, wherein the first ingredient chamber is a liquid-ingredient chamber, and the second ingredient chamber is a solid-ingredient chamber.

17. The beverage ingredient pod of claim 13, wherein the first ingredient chamber comprises a beverage ingredient outlet, wherein the beverage ingredient outlet has a diameter less than 38 mm.

18. The beverage ingredient pod of claim 17, wherein the beverage ingredient outlet has a circular cross section for fitting inside a neck of a bottle and temporarily sealing the interior of the beverage ingredient pod together with an interior of the bottle.

19. The beverage ingredient pod of claim 17, further comprising a filter disposed within the beverage ingredient outlet.

* * * * *